US012675912B2

(12) United States Patent
Carlsson et al.

(10) Patent No.: US 12,675,912 B2
(45) Date of Patent: Jul. 7, 2026

(54) ON-THE-FLY RECALIBRATION OF TRACKING CAMERA

(71) Applicant: Distance Technologies Oy, Helsinki (FI)

(72) Inventors: Thomas Carlsson, Vantaa (FI); Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/656,167

(22) Filed: May 6, 2024

(65) Prior Publication Data

US 2025/0342609 A1     Nov. 6, 2025

(51) Int. Cl.
| | |
|---|---|
| *G06T 7/80* | (2017.01) |
| *G02B 27/00* | (2006.01) |
| *G02B 27/01* | (2006.01) |
| *G02B 30/10* | (2020.01) |
| *G06F 3/01* | (2006.01) |
| *G06T 7/246* | (2017.01) |

(52) U.S. Cl.
CPC ............ *G06T 7/80* (2017.01); *G02B 27/0093* (2013.01); *G02B 27/0101* (2013.01); *G02B 27/0179* (2013.01); *G06F 3/013* (2013.01); *G06T 7/246* (2017.01); *G02B 2027/0138* (2013.01); *G02B 2027/014* (2013.01); *G02B 2027/0187* (2013.01); *G02B 30/10* (2020.01); *G06T 2207/10028* (2013.01); *G06T 2207/10048* (2013.01); *G06T 2207/30201* (2013.01); *G06T 2207/30204* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 10,562,412 B1 * | 2/2020 | Main | .................... | A61B 5/1171 |
| 11,498,500 B1 * | 11/2022 | Pertsel | ................. | G06V 40/103 |

(Continued)

FOREIGN PATENT DOCUMENTS

| | | |
|---|---|---|
| CN | 114049404 A | 2/2022 |
| CN | 114708339 A | 7/2022 |

OTHER PUBLICATIONS

European Patent Office, Extended European Search Report, Application No. 25170589.3-1218, Dated Oct. 10, 2025, 8 Pages.

*Primary Examiner* — Stefan Gadomski
(74) *Attorney, Agent, or Firm* — ZIEGLER IP LAW GROUP, LLC.

(57) ABSTRACT

A first set of reference images is captured using tracking camera(s). Features are extracted from the first set. A first set of features that pertain to at least non-adjustable part(s) of an enclosed space is selected. Positions of the features of the first set are determined. Latest image(s) is/are captured using the tracking camera(s). Features are extracted from the latest image(s). A second set of features that pertain to at least the non-adjustable part(s) and that match with at least a subset of the first set of features, is selected. Positions of the features of the second set are determined. A difference in a position of a given feature of the second set and a position of a corresponding feature of the first set is determined. The tracking camera(s) is/are calibrated.

20 Claims, 3 Drawing Sheets

(56)                    References Cited

U.S. PATENT DOCUMENTS

| | | | |
|---|---|---|---|
| 2016/0249191 A1* | 8/2016 | Avrahami | H04L 67/12 |
| 2019/0095877 A1* | 3/2019 | Li | G06N 20/00 |
| 2019/0206084 A1* | 7/2019 | Noble | G06V 40/19 |
| 2020/0047890 A1* | 2/2020 | Simpson | B60N 2/34 |
| 2020/0254904 A1* | 8/2020 | Karlsson | B60Q 9/00 |
| 2020/0282867 A1* | 9/2020 | Yi | G06V 10/454 |
| 2020/0331415 A1* | 10/2020 | Thomas | B60R 21/01546 |
| 2021/0179117 A1* | 6/2021 | Glazman | B60R 21/0136 |
| 2021/0192257 A1* | 6/2021 | Adusumalli | G06V 20/59 |
| 2021/0192559 A1* | 6/2021 | Saiki | G06Q 30/0208 |
| 2022/0114817 A1* | 4/2022 | Gronau | G06T 7/70 |
| 2022/0272269 A1* | 8/2022 | Nakamura | B60R 11/0235 |
| 2022/0289075 A1* | 9/2022 | Schmalenberg | G06V 10/143 |
| 2023/0046071 A1* | 2/2023 | Arunmozhi | G01S 15/86 |
| 2023/0166687 A1* | 6/2023 | George | B60R 22/48 |
| | | | 382/104 |
| 2023/0377352 A1* | 11/2023 | Rehfeld | G06V 10/14 |
| 2023/0394702 A1* | 12/2023 | Yamazaki | G06V 20/59 |
| 2024/0102867 A1* | 3/2024 | Yi | G01K 1/024 |
| 2024/0104879 A1* | 3/2024 | Jiang | B60W 40/02 |
| 2024/0104941 A1* | 3/2024 | Ren | G06V 20/59 |
| 2024/0221396 A1* | 7/2024 | Raz | H04N 23/56 |
| 2024/0308402 A1* | 9/2024 | Amodeo | B60N 2/0028 |
| 2024/0308456 A1* | 9/2024 | Ghannam | G06V 10/34 |
| 2024/0312247 A1* | 9/2024 | Gorski | G06F 3/017 |
| 2024/0331328 A1* | 10/2024 | Rehfeld | G06V 20/64 |

* cited by examiner

ON-THE-FLY RECALIBRATION OF TRACKING CAMERA

TECHNICAL FIELD

The present disclosure relates to systems incorporating on-the-fly recalibration of tracking cameras. The present disclosure also relates to methods incorporating on-the-fly recalibration of tracking cameras.

BACKGROUND

In the field of 3D computer vision, accurate depth perception and spatial understanding heavily rely on precise calibration of input sensors (for example, such as cameras) to capture intrinsic and extrinsic parameters. Such parameters, obtained through explicit calibration processes during manufacturing, provide crucial information for reconstructing 3D scenes and objects. Similarly, glasses-free augmented reality (AR) systems (for example, such as automotive head-up displays (HUDs) or similar) leverage such sensor technologies to present visual information seamlessly to users without disrupting their primary tasks, such as driving. By incorporating calibrated input sensors into the AR systems, precise spatial mapping and depth perception can enhance an immersive experience of the users, whilst maintaining users' attention on their primary tasks.

However, existing techniques for performing a calibration of input sensors has several limitations associated therewith. For example, a long-term reliability of a sensor accuracy faces significant challenges in real-world applications, particularly, in dynamic environments such as moving vehicles. Over an operational lifetime of a vehicle, mechanical stresses (for example, such as thermal expansion and contraction as well as tensile stress-induced deformations) and temperature are exerted on the input sensors. This results in subtle yet consequential alterations in extrinsic parameters of the input sensors, which is commonly referred to as extrinsic drifts. When such extrinsic drifts are left unmitigated, there is a significant decline in an accuracy of triangulation processes, resulting in compromised (namely, inaccurate) spatial reconstruction of 3D scenes and objects. Thus, a viewing experience of the users is adversely affected, and becomes unrealistic and non-immersive.

An exemplary comparison of different magnitudes of drifts (in milliradians) and errors (in millimetres) in positions of features located at different optical depths (in meters) with respect to a camera, is shown below in Table 1. Herein, greater the magnitude of a drift and greater the optical depth of features from the input sensor, greater is the error in the position of the features.

TABLE 1

| Drift (in milliradians) | Optical depth of 0.9 metres | Optical depth of 1.2 metres | Optical depth of 1.5 metres | Optical depth of 1.8 metres |
|---|---|---|---|---|
| | Error (in millimetres) | | | |
| 2 | 1.8 | 2.4 | 3.0 | 3.6 |
| 4 | 3.6 | 4.8 | 6.0 | 7.2 |
| 8 | 7.2 | 9.6 | 12.0 | 14.4 |
| 10 | 9.0 | 12.0 | 15.0 | 18.0 |

Therefore, in light of the foregoing discussion, there exists a need to overcome the aforementioned drawbacks.

SUMMARY

The present disclosure seeks to provide a system and a method which facilitate a simple, yet accurate and reliable way to calibrate tracking camera(s) arranged inside an enclosed space. The aim of the present disclosure is achieved by a system and a method which incorporate on-the-fly recalibration of a tracking camera, by way of utilising a difference between a position of a given feature extracted from reference images and a position of a corresponding feature extracted from latest image(s), as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 2A illustrates an exemplary reference image, while

DETAILED DESCRIPTION OF EMBODIMENTS

Figure 1:
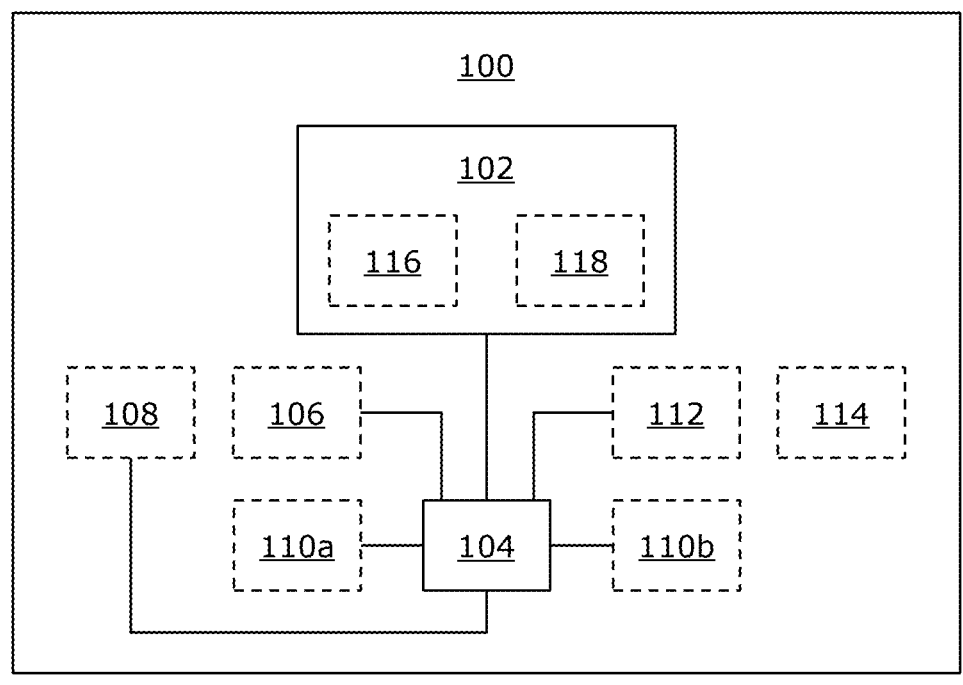
FIG. 1 illustrates a block diagram of an architecture of a system incorporating on-the-fly recalibration of a tracking camera, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

at least one tracking camera arranged inside an enclosed space; and at least one processor configured to:

capture a first set of reference images using the at least one tracking camera;

extract features from the first set of reference images;

select, from amongst the features extracted from the first set of reference images, a first set of features that pertain to at least at least one non-adjustable part of the enclosed space;

determine positions of the features of the first set;

capture at least one latest image using the at least one tracking camera;

extract features from the at least one latest image;

select, from amongst the features extracted from the at least one latest image, a second set of features that pertain to at least the at least one non-adjustable part of the enclosed space and that match with at least a subset of the first set of features;

determine positions of the features of the second set;

determine a difference in a position of a given feature of the second set and a position of a corresponding feature of the first set; and calibrate the at least one tracking camera based on the difference in the position of the given feature and the position of the corresponding feature.

In a second aspect, an embodiment of the present disclosure provides a method comprising:

capturing a first set of reference images using at least one tracking camera that is arranged inside an enclosed space;

extracting features from the first set of reference images;

selecting, from amongst the features extracted from the first set of reference images, a first set of features that pertain to at least at least one non-adjustable part of the enclosed space;

determining positions of the features of the first set;

capturing at least one latest image using the at least one tracking camera;

extracting features from the at least one latest image;

selecting, from amongst the features extracted from the at least one latest image, a second set of features that pertain to at least the at least one non-adjustable part of the enclosed space and that match with at least a subset of the first set of features;

determining positions of the features of the second set;

determining a difference in a position of a given feature of the second set and a position of a corresponding feature of the first set; and calibrating the at least one tracking camera based on the difference in the position of the given feature and the position of the corresponding feature.

The present disclosure provides the aforementioned system and the aforementioned method which facilitate a simple, yet accurate and reliable way to calibrate the at least one tracking camera arranged inside the enclosed space, in a time-efficient and computationally-efficient manner. Herein, the calibration of the at least one tracking camera is performed on-the-fly, by way of utilising the difference between the position of the given feature extracted from the first set of reference images and the position of the corresponding feature extracted from the at least one latest image, said feature pertaining to at least the at least one non-adjustable part of the enclosed space. Beneficially, this facilitates in conveniently mitigating errors that are potentially introduced while capturing subsequent images using the at least one tracking camera. This is because in real-world scenarios where the enclosed space is being used and where any part of the enclosed space may be potentially exposed to wear and tear (for example, such as due to a mechanical stress, a thermal stress, and the like) over a period of time, performing the calibration based on features pertaining to at least the at least one non-adjustable part of the enclosed space would take into account positional drifts in at least some features in the given latest image due to said wear and tear. Performing the calibration in this manner subsequently improves an accuracy of tracking the at least one of: the position of the head of the given user, the position of the first eye and the second eye of the given user, using the at least one tracking camera. The system and the method are simple, robust, fast, reliable, support real-time on-the-fly recalibration of tracking camera(s), and can be implemented with ease.

Notably, the at least one processor controls an overall operation of the system. The at least one processor is communicably coupled to at least the at least one tracking camera. In some implementations, the at least one processor is implemented as a processor of a light field display unit. In other implementations, the at least one processor is implemented as a processor of a computing device. Examples of the computing device include, but are not limited to, a laptop, a tablet, a phablet, and a smartphone. In yet other implementations, the at least one processor is implemented as a cloud server (namely, a remote server) that provides a cloud computing service.

Optionally, the at least one tracking camera is utilised for tracking at least one of: a position of a head of a given user, a position of a first eye and a second eye of the given user, wherein the given user is present inside the enclosed space. It will be appreciated that for performing the aforesaid tracking, the at least one tracking camera is controlled (by the at least one processor) to capture images inside the enclosed space. In this regard, the at least one tracking camera is arranged to face the given user present inside the enclosed space. It is to be understood that for capturing the aforesaid images, at least one region of the enclosed space would lie in a field-of-view of the at least one tracking camera. In this regard, a given image from amongst the aforesaid images is captured from a perspective of a given location and a given viewing angle of the at least one tracking camera. Optionally, the at least one tracking camera comprises at least one of: at least one visible-light camera, at least one infrared (IR) camera. In this regard, said images could be at least one of: visible-light images, IR images. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. It will be appreciated that any combination of various different types of cameras (for example, such as the at least one visible-light camera and the at least one IR camera) may be utilised in the at least one tracking camera. When different types of images captured by the various different types of cameras are utilised, positions of features of a given set (as discussed later) can be determined highly accurately, as results obtained from one type of image can be used to refine results obtained from another type of image. Optionally, the at least one tracking camera further comprises at least one depth camera, in addition to the at least one of: the at least one visible-light camera, the at least one IR camera.

Throughout the present disclosure, the term "enclosed space" refers to a physical space that is at least partially surrounded by boundaries or coverings. In other words, the enclosed space could either be a partially enclosed space or a fully enclosed space. Optionally, the enclosed space is in a form of a cabin of a vehicle. Examples of the vehicle include, but are not limited to, an aircraft, a car, a truck, a ship. The car could be a convertible car or a hardtop car. The vehicle could also be a semi-open vehicle (such as a boat). It is to be understood that when the enclosed space is the cabin of the vehicle, the given user sitting on a seat of the vehicle could be a driver of the vehicle or a passenger in the vehicle. It will be appreciated that the enclosed space may also be located in a museum, a monument, an entertainment park, or the like. The enclosed space may, for example, be a specialised space for interactive activities or similar. It will also be appreciated that the at least one tracking camera could be utilised inside an enclosed space that is rigid. Herein, the term "rigid" refers to only a structural rigidity of the enclosed space. The enclosed space could be movable/portable.

Throughout the present disclosure, the term "reference image" refers to an image that is captured by the at least one tracking camera in an initial condition. Such an initial condition could, for example, be when the enclosed space is freshly manufactured and any part of the enclosed space is yet not exposed to any wear and tear (for example, such as due to a mechanical stress, a thermal stress, and the like). Thus, for such an initial condition, a given reference image from amongst the reference images is to be understood to be captured at a factory manufacturing step. There could also be various other initial conditions than that described hereinabove. Since the given reference image is captured in the initial condition, the given reference image can be understood to be a standard, baseline image representing initial (namely, intended) positions of features pertaining to part(s) of the enclosed space. In such a case, the given reference image would be beneficially utilised for comparing with a given latest image for calibration purposes (as discussed later). Optionally, the at least one processor is configured to control the at least one tracking camera for capturing the first set of reference images. The first set of reference images may comprise a single reference image or a plurality of reference images. An image capturing operation is well-known in the art.

It will be appreciated that a given image captured by utilising the at least one tracking camera represents a visual representation of at least the at least one non-adjustable part of the enclosed space lying in the field-of-view of the at least one tracking camera. The term "visual representation" encompasses colour information represented in the given image, and additionally optionally other attributes (for example, such as depth information, illuminance information, transparency information (namely, alpha values), and the like) associated with the given image. Hereinabove, the term "given image" encompasses at least one of: a given reference image, a given latest image.

Optionally, when extracting features from the given image, the at least one processor is configured to employ at least one feature extraction algorithm. Examples of the features include, but are not limited to, edges, lines, corners, blobs and ridges. Examples of the at least one feature extraction algorithm include, but are not limited to: an edge-detection algorithm (for example, such as Canny edge detector, Deriche edge detector, and the like), a corner-detection algorithm (for example, such as Harris & Stephens corner detector, Shi-Tomasi corner detector, Features from Accelerated Segment Test (FAST) corner detector, and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a line-detection algorithm (for example, such as a standard Hough transform line detector, a probabilistic Hough transform line detector, an extended Hough transform line detector, a line segment detector (LSD) algorithm, and the like), a feature descriptor algorithm (for example, such as Binary Robust Independent Elementary Features (BRIEF), Gradient Location and Orientation Histogram (GLOH), Histogram of Oriented Gradients (HOG), and the like), and a feature detector algorithm (for example, such as Scale-Invariant Feature Transform (SIFT), Oriented FAST and rotated BRIEF (ORB), Speeded Up Robust Features (SURF), and the like). All the aforementioned feature extraction algorithms are well-known in the art. It will be appreciated that some of the aforesaid feature extraction algorithms, for example, such as the ORB, the SIFT, and the SURF, could be employed to extract (namely, identify) key point features from the given image, wherein said key point features are distinctive/salient features in the given image which may be served as reference points for enabling a robust and accurate feature matching between at least two images. This may, for example, be beneficial for performing an image processing operation such as an image stitching operation, an object recognition operation, and the like. The term "given image" encompasses at least one of: a given reference image, a given latest image.

It will be appreciated that locations of at least the at least one non-adjustable part with respect to the at least one tracking camera could be pre-known to the at least one processor. This is because the at least one tracking camera is fixedly arranged inside the enclosed space, and thus information pertaining to where at least the at least one non-adjustable part is located within the field-of-view of the at least one tracking camera can be pre-known, and the at least one processor could easily and accurately ascertain the first set of features by utilising the aforesaid information. The aforesaid information may be available from a data repository coupled to the at least one processor. Additionally, visual information pertaining to at least the at least one non-adjustable part could also be pre-known to the at least one processor in detail (for example, such as when said visual information would be available in a form of individual images of each of the non-adjustable parts, from the data repository). In this regard, the at least one processor could utilise said visual information to select only those features from amongst the extracted features that pertain to (namely, relevant to or relate to) at least the at least one non-adjustable part of the enclosed space, by employing at least one feature matching technique. Feature matching techniques are well-known in the art.

Throughout the present disclosure, the term "non-adjustable part" of the enclosed space refers to a part of the enclosed space whose position and/or orientation cannot be adjusted, for example, by the given user or the system. In other words, the non-adjustable part of the enclosed space are fixed/static. It will be appreciated that when the enclosed space is the cabin of the vehicle (for example, such as a car), the at least one non-adjustable part could, for example, be a B-pillar of the vehicle, a ceiling of the vehicle, a windshield of the vehicle, a door of the vehicle, and the like. It is to be understood that even when the door of the vehicle could be closed or opened by the given user, a position of the door cannot be adjusted by the given user.

Notably, since a given reference image from amongst the reference images is captured by the at least one tracking camera, a position of each feature extracted from the given reference image is already known and accurately known to the at least one processor, for example, from pixel coordinates of pixels in the given reference image. Thus, the positions of the features of the first set could be easily determined by the at least one processor.

Optionally, a position of a given feature extracted from the given image is represented in a given coordinate space. As an example, the given coordinate space may be a Cartesian coordinate space. Optionally, the position of the given feature extracted from the given image is a two-dimensional (2D) position. Alternatively, optionally, the position of the given feature extracted from the given image is a three-dimensional (3D) position. It will be appreciated that such a 3D position could be determined from a stereo disparity between a stereo pair of visible-light images captured by the at least one visible-light camera, when the at least one tracking camera comprises the at least one visible-light camera. Yet alternatively, optionally, the position of the given feature extracted from the given image is a relative position of the given feature with respect to the at least one tracking camera. It will be appreciated that such a relative position could be determined when depth information associated with the given image is available to the at least one processor.

In some implementations, the at least one processor is optionally configured to: determine the position of the given feature in the given image at a time of extracting features from the given image; and store the position of the given feature at a data repository, wherein the data repository is communicably coupled to the at least one processor. In this regard, the stored position of the given feature could be accessed from the data repository, as and when required. In other implementations, instead of storing the position of the given feature at a data repository, the at least one processor is optionally configured to store at least one depth map at the data repository. In this regard, the at least one stored depth map could be accessed from the data repository, and be utilised to determine the positions of the given feature, as and when required. Techniques for determining positions of features from depth maps are well-known in the art. It will be appreciated that the data repository could be implemented, for example, such as a memory of the at least one processor, a memory of the computing device, a removable memory, a cloud-based database, or similar.

Throughout the present disclosure, the term "latest image" refers to an image that is captured by the at least one tracking camera in a real-world condition. Since a given latest image is captured in the real-world condition, the given latest image is understood to be captured at a post-manufacturing step (i.e., when the enclosed space is being used), and there may highly likely be a positional drift in at least some features in the given latest image. This is likely due to wear and tear of parts(s) of the enclosed space by, for example, such as a mechanical stress, a thermal stress, and the like, over a period of time. Optionally, the at least one processor is configured to control the at least one tracking camera for capturing the at least one latest image. The features are extracted from the at least one latest image in a similar manner as discussed earlier.

It will be appreciated that since the first set of features and the locations of at least the at least one non-adjustable part with respect to the at least one tracking camera are already accurately known, the at least one processor could easily and accurately ascertain the second set of features, for example, by employing at least one feature matching technique to select only those features from amongst the extracted features that pertain to at least the at least one non-adjustable part of the enclosed space and that match with at least the subset of the first set of features. Prior to extracting the features from the at least one latest image, the at least one processor may employ a well-known frame stacking technique for reducing image noise from the at least one latest image. It is to be understood that there may be a scenario when the at least one latest image and the set of reference images are captured from slightly different perspectives. In such a scenario, only some of the features of the second set may match with features belonging to the subset of the first set of features, while remaining features of the second set may be unique and may not match with any other features of the first set of features. It will also be appreciated that the at least one processor is optionally configured to trim the second set of features to include only those features in the second set that are clearly visible (namely, well-represented) in both the at least one latest image and the reference images. This may potentially improve an accuracy of performing the calibration of the at least one tracking camera.

Notably, since a given latest image is captured by the at least one tracking camera, a position of each feature extracted from the given latest image is already accurately known to the at least one processor, for example, from pixel coordinates of pixels in the given latest image. Thus, the positions of the features of the second set could be easily determined by the at least one processor. It will be appreciated that since the given reference image is captured in the initial condition (as discussed earlier) and the given latest image is captured in the real-world condition (as discussed earlier in detail), it may be likely that due to said wear and tear, positions of at least some features in the given latest image may appear to be drifted, as compared to their respective (initial/intended) positions in the given reference image. Thus, once the position of the given feature of the second set and the position of the corresponding feature of the first set (that matches with the given feature of the second set) are known, the at least one processor can easily determine the difference therebetween.

It will be appreciated that once the aforesaid difference is known to the at least one processor, intrinsic parameters (for example, such as a focal length, an aperture, a resolution, a field-of-view, a lens distortion coefficient, and the like) and extrinsic parameters (for example, such as a viewing position, a viewing direction, and the like) of the at least one tracking camera could be modified accordingly, for calibrating the at least one tracking camera. Beneficially, this facilitates in conveniently mitigating errors that are potentially introduced while capturing images using the at least one tracking camera in real-world scenarios (as discussed earlier), thereby subsequently improving an accuracy of tracking the at least one of: the position of the head of the given user, the position of the first eye and the second eye of the given user. Thus, an accuracy of triangulation processes may result in an accurate spatial reconstruction of 3D scenes and objects to be displayed to the given user, and a viewing experience of the given user would become realistic and immersive. It will be appreciated that since the given feature refers to one or more features of the second set, the calibration of the at least one tracking camera need not necessarily be performed using an entirety of the features of the second set. For example, when there are 20 features in the second set, the calibration may be performed based on only 5 features out of said 20 features of the second set.

Optionally, the at least one tracking camera is calibrated by utilising bundle adjustment computation. The bundle adjustment computation typically involves an iterative refinement of the intrinsic parameters and the extrinsic parameters of the at least one tracking camera and coordinates of 3D points in a visual scene captured by the at least one tracking camera, to minimize a reprojection error. The bundle adjustment computation is well-known in the art. Additionally or alternatively, optionally, the at least one tracking camera is calibrated by applying a transformation pertaining to at least one of: a translation from the position of the corresponding feature to the position of the given feature, a rotation from the position of the corresponding feature to the position of the given feature. Techniques for applying different transformations are well-known in the art. It will be appreciated that there may also be some consistent or systematic errors in depth information captured by the at least one tracking camera. Such depth map shifts/errors could be due to various factors, for example, such as a lens distortion, inaccuracies in camera calibration, environmental conditions, and the like. In order to mitigate this potential problem, during the aforesaid calibration, a scaling factor can be computed by the at least one processor and be applied to subsequent depth images captured by the at least one tracking camera. Such a scaling factor is a value that, when applied to depth values of pixels of the subsequent depth images, enables in correcting the systematic depth map shifts. The scaling factor can be determined based on calibration data (namely, the intrinsic parameters and the extrinsic parameters) or through an empirical analysis of depth information. Thus, upon performing such calibration, an accuracy and a reliability of depth measurements provided by the at least one tracking camera can be significantly improved.

Optionally, the at least one tracking camera comprises at least one depth camera, wherein the at least one processor is configured to:

capture a first set of reference depth images using the at least one depth camera, when capturing the first set of reference images, wherein the positions of the features of the first set are determined by utilising the first set of reference depth images; and capture at least one latest depth image using the at least one depth camera, when capturing the at least one latest image, wherein the positions of the features of the second set are determined by utilising the at least one latest depth image.

In this regard, the term "depth image" refers to an image that is indicative of optical depths of parts of the enclosed space from a perspective of the at least one tracking camera which captured a given depth image. Herein, the term "given depth image" encompasses at least one of: a given reference depth image, a given latest depth image. Optionally, the given depth image is in a form of a depth map. Herein, the term "depth map" refers to a data structure comprising information pertaining to the optical depths of the parts of the enclosed space. The depth map could be an image comprising a plurality of pixels, wherein a pixel value of each pixel indicates an optical depth of its corresponding 3D point within the enclosed space. Examples of the at least one depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera.

It will be appreciated that a 2D position of a given feature extracted from a given image is already accurately known to the at least one processor, for example, from pixel coordinates of corresponding pixels in the given image. In addition to this, by utilising the given depth image, a depth coordinate for each pixel along a depth axis (namely, a Z-axis) of the at least one tracking camera) could also be easily known to the at least one processor. Therefore, by utilising said pixel coordinates and said depth coordinate, a position of a given feature of a given set can be accurately and conveniently determined accordingly. Herein, the term "given set" of features encompasses at least one of: the first set of features, the second set of features. It will also be appreciated that when the given depth image is utilised for determining the position of the given feature of the given set, said position could be any of: a 3D position of the given feature in a common coordinate space, a relative position of the given feature with respect to the at least one tracking camera. The technical benefit of determining the positions of the features of the first set and the positions of the features of the second set in the aforesaid manner is that said positions are realistically determined, which may potentially improve an accuracy of performing the calibration of the at least one tracking camera.

Optionally, the at least one tracking camera comprises at least one infrared (IR) camera, wherein IR visual markers are arranged on the at least one non-adjustable part of the enclosed space. In this regard, when the IR camera is utilised for capturing the given image (i.e., the given reference image and/or the given latest image), the IR visual markers having IR visible features are captured in the given image. Beneficially, in such a case, the IR visible features can be utilised as at least some of the features extracted from the given image. Additionally, since the IR visual markers are arranged on the at least one non-adjustable part, the IR visible features could also be utilised by the at least one processor for selecting only those features (from amongst features extracted from the given image) that pertain to the at least one non-adjustable part. In this way, the first set of features and/or the second set of features could be accurately determined. It will be appreciated that since the at least one IR camera is less susceptible to variations in lighting conditions as compared to the at least one visible-light camera, the IR visual markers (that emit or reflect infrared light) could be easily detected by the at least one IR camera for image capturing, even in a low light or variable lighting inside the enclosed space.

In an embodiment, the enclosed space is a cabin of a vehicle, wherein the system further comprises at least one sensor employed to detect a setting of at least one adjustable seat parameter of at least one seat of the vehicle, and wherein the at least one processor is configured to:

detect, using the at least one sensor, settings of the at least one adjustable seat parameter of the at least one seat, when capturing a plurality of sets of reference images, the plurality of sets of reference images comprising the first set of reference images and at least one other set of reference images;

classify the plurality of sets of reference images based on different settings of the at least one adjustable seat parameter;

detect, using the at least one sensor, a latest setting of the at least one adjustable seat parameter of the at least one seat, when capturing the at least one latest image; and select the first set of reference images from amongst the plurality of sets of reference images, based on a match between the latest setting of the at least one adjustable seat parameter when the at least one latest image is captured and a setting of the at least one adjustable seat parameter when the first set of reference images was captured.

The term "sensor" refers to equipment that is operable to detect (namely, sense) a setting of a given adjustable seat parameter of a given seat of the vehicle. The given seat could be at least one of: at least one front seat, at least one back seat, of the vehicle. The at least one sensor is optionally communicably coupled to the at least one processor. The term "adjustable seat parameter" refers to a characteristic of the given seat (or its part) that can be modified to accommodate different preferences or requirements of a given user sitting on the given seat of the vehicle. It is to be understood that seat parameters are typically designed to be adjustable (namely, customizable) for allowing the given user to tailor a seat configuration according to his/her need for comfort and ergonomics. Furthermore, the term "setting" of a given adjustable seat parameter refers to a current state of the characteristic of the given seat (or its part). Optionally, a setting of the given adjustable seat parameter is represented in the given coordinate space. Optionally, the at least one adjustable seat parameter comprises at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat. Optionally, the at least one sensor comprises at least one camera, wherein the at least one processor is configured to process at least one image captured by the at least one camera, to determine the setting of the given adjustable seat parameter. Optionally, when processing the at least one image, the at least one processor is configured to: extract a plurality of features from the at least one image; identify the given seat, based on the plurality of features; and determine the setting of the given adjustable seat parameter for the given identified seat by utilising a pre-known 3D model of the given seat.

It will be appreciated that different sets of reference images are captured for different settings of the at least one adjustable seat parameter of the at least one seat. It is to be understood that the different setting of the at least one adjustable seat parameter are detected at a same time when the different sets of reference images are captured (for example, such as at the factory manufacturing step). The at least one other set of reference images could, for example, be a second set of reference images, a third set of reference images, and so on. Since the at least one processor already has a knowledge of which sets of reference images correspond to which settings of the at least one adjustable seat parameter, a classification of the plurality of sets of reference images could be easily performed. In an example, for a given adjustable seat parameter P, a set X1 of reference images is captured when the given adjustable seat parameter P has a setting S1; a set X2 of reference images is captured when the given adjustable seat parameter P has a setting S2; a set X3 of reference images is captured when the given adjustable seat parameter P has a setting S3; and so on.

Further, in the real-world scenario when the enclosed space is being used, the latest setting of the at least one adjustable seat parameter is detected when capturing the at least one latest image. It will be appreciated that when the latest setting matches with the setting of the at least one adjustable seat parameter when the first set of reference images was captured, it means that the at least one latest image and the reference images of the first set are captured for a same setting of the at least one adjustable parameter. Referring to and continuing with the aforesaid example, a latest setting of the given adjustable parameter P may be S3, which matches with the setting with which the set X3 of reference images was captured. Thus, the set X3 of reference images would be selected as the first set of reference images.

The technical benefit of selecting the first set of reference images in the aforesaid manner is that it enables in improving an accuracy of selecting the second set of features that pertain to at least the at least one non-adjustable part and that match with at least the subset of the first set of features. This is because when the at least one latest image and the reference images of the first set are captured corresponding to the same setting of the at least one adjustable parameter, visual information represented in both the at least one latest and the reference images is considerably consistent, for example, in terms of a minimal variability in lighting, a viewing perspective, and other factors that could affect an appearance of a same feature in both the aforesaid images. Thus, matching features between such images captured at the same setting enables more accurate correspondence between said features, because features that are visible and easily identifiable in one image captured under a specific setting are more likely to be present and identifiable in another image captured under the same specific setting. This significantly improves an accuracy of feature matching between the at least one latest image and the reference images, leading to more reliable results.

Optionally, the first set of features and the second set of features pertain to the at least one seat of the vehicle also. In this regard, the first set of features and the second set of features could also pertain to at least one adjustable part (namely, the at least one seat) of the enclosed space, in addition to the at least one non-adjustable part of the enclosed space. Herein, the term "adjustable part" of the enclosed space refers to a part of the enclosed space whose position and/or orientation can be adjusted, for example, by the given user or the system. In other words, the adjustable part of the enclosed space are flexible/non-static. When the enclosed space is the cabin of the vehicle (for example, such as a car), the at least one adjustable part could, for example, be the at least one seat of the vehicle. The technical benefit of utilising the given set of features that pertain to both the at least one non-adjustable part and the adjustable part of the enclosed space for calibrating the at least one tracking camera is that an accuracy and a reliability of performing the aforesaid calibration would be significantly improved.

Optionally, the at least one processor is configured to calibrate the at least one sensor based on the difference in the position of the given feature and the position of the corresponding feature. In this regard, since the at least one sensor is also arranged inside the enclosed space, it may be likely that when the enclosed space is being used, the at least one sensor may also be potentially exposed to said wear and tear (for example, such as due to the mechanical stress) over a period of time. In such a case, subsequent settings of the at least one adjustable seat parameter that are to be detected by the at least one sensor could be inaccurately and unreliably detected. Thus, in order to mitigate this potential problem, calibration parameters of the at least one sensor could be modified accordingly, for calibrating the at least one sensor, based on said difference, in a similar manner as described earlier in detail with respect to the at least one tracking camera. It may be noted that the aforesaid calibration would work in a bidirectional manner, namely both the at least one sensor and the at least one tracking camera can be calibrated at a same time. Beneficially, this facilitates in conveniently mitigating errors that are potentially introduced while detecting the subsequent setting, thereby subsequently improving an accuracy of the at least one sensor in different real-world scenarios. It will be appreciated that the calibration parameters of the at least one sensor depends on a type of the at least one sensor, as different types of sensors typically have distinct characteristics and operating principles, which necessitate specific calibration parameters.

In an alternative or additional embodiment, the system further comprises an ambient light sensor, wherein the at least one processor is configured to:

capture, using the ambient light sensor, average illuminances inside the enclosed space, when capturing a plurality of sets of reference images, the plurality of sets of reference images comprising the first set of reference images and at least one other set of reference images;

classify the plurality of sets of reference images based on different ranges of average illuminances;

capture, using the ambient light sensor, an average illu- minance inside the enclosed space, when capturing the at least one latest image; and select the first set of reference images from amongst the plurality of sets of reference images, based on a match between the average illuminance when the at least one latest image is captured and a range of average illumi- nances when the first set of reference images was captured.

The term "ambient light sensor" refers to a sensor that is capable of detecting and measuring an amount of light present in its surrounding. Ambient light sensors and their working are well-known in the art. The term "average illuminance" inside the enclosed space refers to an average amount of light intensity per unit area inside the enclosed space. In other words, the average illuminance is an average brightness level across an area within the enclosed space, taking into account variations in light intensities across said area. The ambient light sensor is optionally communicably coupled to the at least one processor.

It will be appreciated that different sets of reference images are captured for different average illuminances cap- tured inside the enclosed space. It is to be understood that the different average illuminances are captured (namely, mea- sured) at a same time when the different sets of reference images are captured (for example, such as at the factory manufacturing step). Since the at least one processor already has a knowledge of which sets of reference images corre- spond to which average illuminances, and a knowledge of the different ranges of average illuminances, a classification of the plurality of sets of reference images could be easily performed. In an example, for a sunny outdoor environment, a range of average illuminances may be from 1000 lux (namely, lumens per square meter) to 10000 lux. For a cloudy outdoor environment, a range of average illumi- nances may be from 100 lux (namely, lumens per square meter) to 2000 lux. For a dark outdoor environment, a range of average illuminances may be from 1 lux (namely, lumens per square meter) to 100 lux. Information pertaining to the different ranges of average illuminances may be pre-stored at the data repository. Further, in the real-world scenario when the enclosed space is being used, the average illumi- nance is captured when capturing the at least one latest image. It will be appreciated that when the average illumi- nance corresponding the at least one latest image matches with (namely, lies within) the range of average illuminances corresponding to the first set of reference images, it means that the at least one latest image and the reference images of the first set are captured at a similar average illuminance.

The technical benefit of selecting the first set of reference images in the aforesaid manner is that it enables in improv- ing an accuracy of selecting the second set of features that pertain to at least the at least one non-adjustable part and that match with at least the subset of the first set of features. This is because when the at least one latest image and the reference images of the first set are captured at the similar average illuminance, visual information represented in both the at least one latest and the reference images is consider- ably consistent, for example, in terms of a minimal vari- ability in lighting/brightness, and optionally, a viewing perspective, and other factors that could affect an appearance of a same feature in both the aforesaid images. Thus, matching features between such images captured at the similar average illuminance enables more accurate corre- spondence between said features, because features that are visible and identifiable in one image captured at a given brightness level are more likely to be present and easily identifiable in another image captured under the similar brightness level. This significantly improves an accuracy of feature matching between the at least one latest image and the reference images, leading to a more reliable, illumina- tion-invariant calibration of the at least one tracking camera.

In another alternative or additional embodiment, the sys- tem further comprises at least one temperature sensor, wherein the at least one processor is configured to:

determine, using the at least one temperature sensor, ambient temperatures inside the enclosed space, when capturing a plurality of sets of reference images, the plurality of sets of reference images comprising the first set of reference images and at least one other set of reference images;

classify the plurality of sets of reference images based on different ranges of ambient temperatures;

determine, using the at least one temperature sensor, an ambient temperature inside the enclosed space, when capturing the at least one latest image; and select the first set of reference images from amongst the plurality of sets of reference images, based on a match between the ambient temperature when the at least one latest image is captured and a range of ambient tem- peratures when the first set of reference images was captured.

Optionally, the at least one temperature sensor is imple- mented as any one of: an infrared-based temperature sensor, a thermistor, a resistance temperature detector (RTD). Tem- perature sensors and their working are well-known in the art. It will be appreciated that the at least one temperature sensor is optionally arranged inside the enclosed space for deter- mining the ambient temperature. The at least one tempera- ture sensor is optionally communicably coupled to the at least one processor. The at least one temperature sensor may comprise a plurality of temperature sensors.

It will be appreciated that different sets of reference images are captured for different ambient temperatures determined inside the enclosed space. It is to be understood that the different ambient temperatures are determined at a same time when the different sets of reference images are captured (for example, such as at the factory manufacturing step). Since the at least one processor already has a knowl- edge of which sets of reference images correspond to which ambient temperatures, and a knowledge of the different ranges of ambient temperatures, a classification of the plu- rality of sets of reference images could be easily performed. In an example, a first range of ambient temperatures may lie from 0 to 10 degrees Celsius. A second range of ambient temperatures may lie from 10 to 20 degrees Celsius. A third range of ambient temperatures may lie from 20 to 30 degrees Celsius. A fourth range of ambient temperatures may lie from 30 to 40 degrees Celsius. In some scenarios, for example, when the enclosed space is the cabin of the vehicle, it may be noted that extreme temperatures (for example, such as greater than or equal to 50 degrees Celsius) would be experienced only at a time of starting the vehicle, for approximately 20 minutes from the time of starting the vehicle. This is because air conditioning inside the vehicle is typically used to maintain a user's preferred temperature range inside the vehicle. Information pertaining to the dif- ferent ranges of ambient temperatures may be pre-stored at the data repository. Further, in the real-world scenario when the enclosed space is being used, the ambient temperature is determined when capturing the at least one latest image. It will be appreciated that when the ambient temperature corresponding the at least one latest image matches with (namely, lies within) the range of ambient temperatures corresponding to the first set of reference images, it means that the at least one latest image and the reference images of the first set are captured at a similar ambient temperature.

The technical benefit of selecting the first set of reference images in the aforesaid manner is that it enables in improving an accuracy of selecting the second set of features that pertain to at least the at least one non-adjustable part and that match with at least the subset of the first set of features. This is because when the at least one latest image and the reference images of the first set are captured at a similar ambient temperature, visual information represented in both the at least one latest and the reference images is considerably consistent, for example, in terms of a minimal variability in white balance, colour balance, and optionally, a viewing perspective, and other factors that could affect an appearance of a same feature in both the aforesaid images. Moreover, a thermal expansion of part(s) of the enclosed space would also be similar for the similar ambient temperature. Thus, matching features between such images captured at the similar ambient temperature enables more accurate correspondence between said features, because features that are visible and identifiable in one image captured at a given ambient temperature are more likely to be present and easily identifiable in another image captured under a similar ambient temperature. This may significantly improve an accuracy of feature matching between the at least one latest image and the reference images, leading to more reliable results.

Optionally, the method further comprises a plurality of temperature sensors arranged at different parts of the enclosed space, wherein the at least one processor is configured to:

determine a temperature gradient across the enclosed space using the plurality of temperature sensors, when capturing the at least one latest image; and determine a shift in the position of the given feature of the second set due to the temperature gradient, wherein the at least one tracking camera is calibrated further based on the shift in the position of the given feature due to the temperature gradient.

The term "temperature gradient" refers to a rate of change of temperature (namely, a variation of temperature) across the enclosed space in a given direction. The given direction could be at least one of: a vertical direction, a horizontal direction. It will be appreciated that since the temperature gradient is to be determined across the enclosed space, the plurality of temperature sensors are arranged at the different parts of the enclosed space. In a real-world condition, the different parts of the enclosed space would have different temperatures. For example, when the enclosed space is the cabin of the vehicle, some parts of the cabin that are exposed to direct sunlight (for example, such as a dashboard, a seat, and a steering wheel, of the vehicle) may have a higher temperature, as compared to remaining parts of the cabin that are under shade. Each temperature sensor from the plurality of temperature sensors is controlled to determine a temperature of a given part of the enclosed space. Thus, the at least one processor can easily and accurately ascertain the temperature gradient using the different temperatures determined corresponding to the different parts of the enclosed space. The temperature gradient may also be predicted by the at least one processor based on a direction and intensity of sunlight. For such a prediction, different sensors could be utilised to determine the direction and the intensity of sunlight. Furthermore, it is to be noted that the temperature gradient needs to be determined for the at least one latest image only, because the reference images are typically captured in an initial condition (as discussed earlier).

Due to the temperature gradient, at least a part of the enclosed space may likely be exposed to thermal stresses over a period of time, and thus there may be a likelihood of an uneven thermal expansion of at least said part of the enclosed space. In such a case, at least some features extracted from the at least one latest image may experience a shift in their respective positions. Optionally, when determining the shift in the position of the given feature of the second set due to the temperature gradient, the at least one processor is configured to employ at least one of: at least one simulation model of the enclosed space, the reference images captured using the at least one tracking camera. Therefore, the at least one tracking camera is calibrated by taking into account the aforesaid shift. The at least one simulation model of the enclosed space could be pre-generated and pre-stored at the data repository. Optionally, the at least one processor is configured to apply a transformation to the position of the given feature of the second set, for undoing an effect of the uneven thermal expansion due to the temperature gradient; and utilise the transformed position of the given feature of the second set for actual calibration purposes.

Optionally, the enclosed space is a cabin of a vehicle, wherein the system further comprises at least one sensor employed to sense an orientation of the vehicle, and wherein the at least one processor is configured to:

detect when the orientation of the vehicle is greater than a predefined threshold orientation; and when it is detected that the orientation of the vehicle is greater than the predefined threshold orientation, any one of:

determine a shift in the position of the given feature of the second set due to the orientation of the vehicle, wherein the at least one tracking camera is calibrated further based on the shift in the position of the given feature of the second set due to the orientation of the vehicle, or skip calibrating the at least one tracking camera.

Optionally, in this regard, the at least one sensor comprises at least one of: at least one accelerometer, at least one gyroscopic sensor. Optionally, the at least one sensor further comprises at least one magnetometer. It will be appreciated that the at least one accelerometer, the at least one gyroscopic sensor, and the at least one magnetometer could be parts of an inertial measurement unit (IMU) or a triaxial inertial measurement unit (TIMU). Accelerometers, gyroscopic sensors, magnetometers, IMUs, and TIMUs are well-known in the art. Optionally, the at least one processor is configured to process sensor data, collected by the at least one sensor, to determine the orientation of the vehicle at a given time instant. The orientation of the vehicle may be determined with respect two axes of rotations only, namely roll and pitch (and not yaw). The sensor data may be in form of IMU/TIMU values, motion sensor data values, magnetic field strength values, or similar.

Optionally, the predefined threshold orientation of the vehicle lies in a range of 5 degrees to 10 degrees along any given direction. It will be appreciated that when the orientation of the vehicle is greater than the predefined threshold orientation, it means that at least a part of the vehicle is significantly inclined/bent with respect to a ground level, which could potentially result in the shift in the position of the given feature of the second set. This may, for example, occur when the vehicle is parked on a steep hill, when the vehicle is being driven on uneven terrain that deviates its orientation to from a ground level, when the vehicle is being navigated through sharp turns or bends in a road, or similar. Therefore, optionally, when determining the shift in the position of the given feature of the second set due to the orientation of the vehicle, the at least one processor is configured to employ at least one of: the at least one simulation model of the enclosed space, the reference images captured using the at least one tracking camera. It may be noted that the orientation of the vehicle needs to be detected when the at least one latest image is being captured, because the reference images are typically captured in an initial condition (as discussed earlier). Optionally, the at least one processor is configured to apply a transformation to the position of the given feature of the second set, for undoing an effect of the orientation of the vehicle that exceeds the predefined threshold orientation; and utilise the transformed position of the given feature of the second set for actual calibration purposes. Alternatively, optionally, the at least one processor does not perform (namely, skips) the calibration the at least one tracking camera by taking into account the shift in the position of the given feature of the second set, and performs the calibration by taking into account only those features of the second set that are not exposed to any positional shifts due to the orientation of the vehicle. This may potentially facilitate in saving processing resources and processing time of the at least one processor.

Optionally, the system further comprises a light field display unit, and an optical combiner arranged on an optical path of the light field display unit and on an optical path of a real-world light field of a real-world environment, wherein the at least one processor is configured to:

utilise the at least one tracking camera, after calibrating the at least one tracking camera, to determine a relative location of a first eye and of a second eye of at least one user with respect to the optical combiner;

generate an input to be employed by the light field display unit for producing a synthetic light field, based on the relative location of the first eye and of the second eye of the at least one user with respect to the optical combiner; and employ the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

In this regard, when the at least one (calibrated) tracking camera is utilised, an accuracy and a reliability of determining the relative location is significantly higher, as compared to a case when the at least one tracking camera is not calibrated. Advantageously, this enables in accurately and realistically presenting the virtual content to each eye of the at least one user, wherein the at least one user is present inside the enclosed space. For determining the relative location, the at least one tracking camera detects and/or follows a location of the first eye and of the second eye of the at least one user. The first eye could be one of a left eye of the at least one user and a right eye of the at least one user, whereas the second eye could be another of the left eye and the right eye. It will be appreciated that irrespective of where the at least one tracking camera is arranged, a relative location of the at least one tracking camera with respect to the optical combiner is fixed, and is pre-known to the at least one processor. This enables to determine the relative location of the first eye and of the second eye with respect to the optical combiner. Optionally, in this regard, when the at least one tracking camera is utilised to detect and/or follow the location of the first eye and of the second eye, a location of the first eye and of the second eye with respect to the at least one tracking camera is accurately known to the at least one processor, from tracking data collected by the at least one tracking camera. Thus, the at least one processor can easily and accurately determine the relative location of the first eye and of the second eye with respect to the optical combiner, based on the relative location of the at least one tracking camera with respect to the optical combiner and the location of the first eye and of the second eye with respect to the at least one tracking camera. Optionally, the relative location of the first eye and of the second eye is represented in the given coordinate space.

Furthermore, optionally, the at least one tracking camera repeatedly tracks the location of both eyes of the at least one user throughout a given session of using the system. In such a case, the at least one processor is configured to repeatedly determine the relative location of the first eye and of the second eye with respect to the optical combiner (in real time or near-real time). Beneficially, this potentially allows for presenting the at least one user with an augmented view of the synthetic light field with the real-world light field in an autostereoscopic manner. It is to be understood that when a plurality of users are present inside the enclosed space (for example, in a scenario where the enclosed space is in the form of the cabin of the vehicle, and more than one user is present inside the cabin of the vehicle), the at least one processor is configured to determine relative locations of both eyes of each user in a same manner as discussed hereinabove. Moreover, the relative location of the first eye and of the second eye is determined with respect to the optical combiner, because the synthetic light field (that is being produced by the light field display unit) would be presented to the at least one user via the optical combiner only.

The term "optical combiner" refers to specialised equipment that is capable of reflecting a corresponding part of the synthetic light field towards a given eye of a given user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when the plurality of users are present inside the enclosed space, some users may directly face the optical combiner (namely, in almost a straight manner), while remaining users may face the optical combiner in a diagonal manner (namely, obliquely or sideways). Optionally, a tilt angle of the optical combiner with respect to an image plane of the light field display unit lies in a range of 30 degrees and 60 degrees.

The input employed by the light field display unit can be in various different forms, depending on a type of the light field display unit that is implemented. As a first example, in case of a hogel-based light field display unit or a lenticular array-based light field display unit or a parallax barrier-based light field display unit, the input can be in a form of a light field image comprising pixels. As a second example, in case of a hologram-projector based light field display unit, the input is in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input is in a form of a video signal comprising analog electrical signals. All the aforementioned forms of light field display units and their corresponding inputs are well-known in the art.

In case of a light field image, the input may be understood to be a two-dimensional (2D) image comprising a plurality of pixels, wherein a first part of the input comprises a first set of pixels from amongst the plurality of pixels that is responsible for generating the first part of the synthetic light field that corresponds to the first eye, and a second part of the input comprises a second set of pixels from amongst the plurality of pixels that is responsible for generating the second part of the synthetic light field that corresponds to the second eye. It will be appreciated that the pixels belonging to the first set are not arranged in a continuous manner across the light field image (namely, the input); similarly, the pixels belonging to the second set are also not arranged in a continuous manner across the light field image. Optionally, the pixels belonging to the first set and the pixels belonging to the second set may be arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the (single) light field image would comprise visual information corresponding to the first eye as well as the second eye of the at least one user.

In some implementations, the virtual content presented by the synthetic light field corresponds to at least one virtual object. Optionally, in this regard, the at least one processor is configured to generate the input from a perspective of the relative location of the first eye and of the second eye of the at least one user, by employing a three-dimensional (3D) model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model of a virtual object" refers to a data structure that comprises comprehensive information pertaining to the virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model of the at least one virtual object may be generated in the form of a 3D polygonal mesh, a 3D point cloud, a 3D surface cloud, a voxel-based model, or similar. Optionally, the 3D model of the at least one virtual object is generated in the given coordinate space. Optionally, the at least one processor is configured to store the 3D model of the at least one virtual object at the data repository.

The term "real-world light field" refers to a light field emanating from the real-world environment in which a given user is present. Moreover, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the first eye and the second eye of the at least one user. In this way, visual information (for example, such as colour information, optical depth information, and the like) pertaining to said real-world objects is typically perceived by the left eye and the right eye. On the other hand, in case of the synthetic light field, light emanating from the light field display unit, upon reflecting off the optical combiner, is incident on the first eye and the second eye of the at least one user. In this way, visual information pertaining to the at least one virtual object (namely, the virtual content) can be perceived by the first eye and the second eye.

It will also be appreciated that when the optical combiner reflects the first part and the second part of the synthetic light field towards the first eye and the second eye, respectively, it means that light produced by a first part of the input, generating the first part of the synthetic light field, is directed towards the first eye upon reflecting off the optical combiner. Simultaneously, light produced by a second part of the input, generating the second part of the synthetic light field, is directed towards the second eye upon reflecting off the optical combiner. Therefore, upon said reflection of the first part and the second part of the synthetic light field, visual information corresponding to the first part of the input and the second part of the input is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the at least one user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to the real-world objects present in the real-world environment. Advantageously, this provides a result that is similar to displaying a combined view of a virtual image augmenting a real-world image to the at least one user.

Further, the term "light field display unit" refers to specialised equipment that is capable of producing the synthetic light field. In other words, the light field display unit is utilised to employ the input (generated by the at least one processor) to produce the synthetic light field at a given resolution. As mentioned earlier, different types of light field display units can be implemented. For example, the light field display unit can be any one of: a hogel-based light field display unit, a lenticular array-based light field display unit, a parallax barrier-based light field display unit, a hologram-projector based light field display unit, a scanning-laser based light field display unit, a CRT-like light field display unit.

It will be appreciated that when the plurality of users are present inside the enclosed space, the same input is employed by the light field display unit for producing the synthetic light field presenting the virtual content to the plurality of users simultaneously. In such a case, a resolution of the first part and the second part of the synthetic light field being displayed to a particular user depends on a number of users for which the input has been generated. For example, when the synthetic light field is to be produced for a single user, the first part of the synthetic light field may be generated by 50 percent of the input, and the second part of the synthetic light field may be generated by a remaining 50 percent of the input. In such a case, an effective resolution per eye would be a half of a native display resolution of the light field display unit. However, when the synthetic light field is to be produced for two users, for each of the two users, the first part of the synthetic light field may be generated by 25 percent of the input, and the second part of the synthetic light field may be generated by 25 percent of the input. In such a case, an effective resolution per eye would be one-fourth of the native display resolution of the light field display unit. In other words, greater the number of users, lower is the resolution of the first part and the second part of the synthetic light field being displayed to a single user, and vice versa.

The present disclosure also relates to the method as described above. Various embodiments and variants disclosed above, with respect to the aforementioned first aspect, apply mutatis mutandis to the method.

Optionally, the at least one tracking camera comprises at least one depth camera, wherein the method further comprises:

capturing a first set of reference depth images using the at least one depth camera, when capturing the first set of reference images, wherein the positions of the features of the first set are determined by utilising the first set of reference depth images; and capturing at least one latest depth image using the at least one depth camera, when capturing the at least one latest image, wherein the positions of the features of the second set are determined by utilising the at least one latest depth image.

Optionally, in the method, the at least one tracking camera comprises at least one infrared (IR) camera, and wherein IR visual markers are arranged on the at least one non-adjustable part of the enclosed space.

In an embodiment, the enclosed space is a cabin of a vehicle, wherein the method further comprises:

detecting, using at least one sensor, settings of the at least one adjustable seat parameter of at least one seat of the vehicle, when capturing a plurality of sets of reference images, the plurality of sets of reference images comprising the first set of reference images and at least one other set of reference images;

classifying the plurality of sets of reference images based on different settings of the at least one adjustable seat parameter;

detecting, using the at least one sensor, a latest setting of the at least one adjustable seat parameter of the at least one seat, when capturing the at least one latest image; and selecting the first set of reference images from amongst the plurality of sets of reference images, based on a match between the latest setting of the at least one adjustable seat parameter when the at least one latest image is captured and a setting of the at least one adjustable seat parameter when the first set of reference images was captured.

Optionally, in the method, the first set of features and the second set of features pertain to the at least one seat of the vehicle also.

Optionally, the method further comprises calibrating the at least one sensor based on the difference in the position of the given feature and the position of the corresponding feature.

In an alternative or additional embodiment, the method further comprises:

capturing, using an ambient light sensor, average illuminances inside the enclosed space, when capturing a plurality of sets of reference images, the plurality of sets of reference images comprising the first set of reference images and at least one other set of reference images;

classifying the plurality of sets of reference images based on different ranges of average illuminances;

capturing, using the ambient light sensor, an average illuminance inside the enclosed space, when capturing the at least one latest image; and selecting the first set of reference images from amongst the plurality of sets of reference images, based on a match between the average illuminance when the at least one latest image is captured and a range of average illuminances when the first set of reference images was captured.

In another alternative or additional embodiment, the method further comprises:

determining, using at least one temperature sensor, ambient temperatures inside the enclosed space, when capturing a plurality of sets of reference images, the plurality of sets of reference images comprising the first set of reference images and at least one other set of reference images;

classifying the plurality of sets of reference images based on different ranges of ambient temperatures;

determining, using the at least one temperature sensor, an ambient temperature inside the enclosed space, when capturing the at least one latest image; and selecting the first set of reference images from amongst the plurality of sets of reference images, based on a match between the ambient temperature when the at least one latest image is captured and a range of ambient temperatures when the first set of reference images was captured.

Optionally, the method further comprises:

determining a temperature gradient across the enclosed space using a plurality of temperature sensors, when capturing the at least one latest image, wherein the plurality of temperature sensors arranged at different parts of the enclosed space; and determining a shift in the position of the given feature of the second set due to the temperature gradient, wherein the at least one tracking camera is calibrated further based on the shift in the position of the given feature due to the temperature gradient.

Optionally, the enclosed space is a cabin of a vehicle, wherein the method further comprises:

detecting when an orientation of the vehicle is greater than a predefined threshold orientation, wherein at least one sensor is employed to sense the orientation of the vehicle; and when it is detected that the orientation of the vehicle is greater than the predefined threshold orientation, performing any one of:

determining a shift in the position of the given feature of the second set due to the orientation of the vehicle, wherein the at least one tracking camera is calibrated further based on the shift in the position of the given feature of the second set due to the orientation of the vehicle, or skipping calibrating the at least one tracking camera.

Optionally, the method further comprises:

utilising the at least one tracking camera, after calibrating the one tracking camera, to determine a relative location of a first eye and of a second eye of at least one user with respect to an optical combiner, the optical combiner being arranged on an optical path of a light field display unit and on an optical path of a real-world light field of a real-world environment;

generating an input to be employed by the light field display unit for producing a synthetic light field, based on the relative location of the first eye and of the second eye of the at least one user with respect to the optical combiner; and employing the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

DETAILED DESCRIPTION OF THE DRAWINGS

Referring to FIG. 1, illustrated is a block diagram of an architecture of a system 100 incorporating on-the-fly recalibration of a tracking camera, in accordance with an embodiment of the present disclosure. With reference to FIG. 1, the system 100 comprises at least one tracking camera (for example, depicted as a tracking camera 102) and at least one processor (for example, depicted as a processor 104). Optionally, the system 100 further comprises at least one sensor (for example, depicted as a sensor 106), an ambient light sensor 108, at least one temperature sensor (for example, depicted as two temperature sensors 110*a* and 110*b*), a light field display unit 112, and an optical combiner 114. In some implementations, the at least one temperature sensor comprises a plurality of temperature sensors. The processor 104 is communicably coupled to the tracking camera 102, and optionally, to the sensor 106, the ambient light sensor 108, the temperature sensors 110*a* and 110*b*, and the light field display unit 112. Optionally, the tracking camera 102 comprises at least one depth camera (for example, depicted as a depth camera 116) and at least one infrared (IR) camera (for example, depicted as an IR camera 118). Optionally, the processor 104 is communicably coupled to the depth camera 116 and the IR camera 118.

It may be understood by a person skilled in the art that FIG. 1 includes a simplified example implementation of the system 100, for sake of clarity, which should not unduly limit the scope of the claims herein. It is to be understood that the specific implementation of the system 100 is not to be construed as limiting it to specific numbers or types of tracking cameras, processors, sensors, ambient light sensors, temperature sensors, light field display units, optical combiners, depth cameras, and IR cameras. The person skilled in the art will recognize many variations, alternatives, and modifications of embodiments of the present disclosure.

Figure 2A:
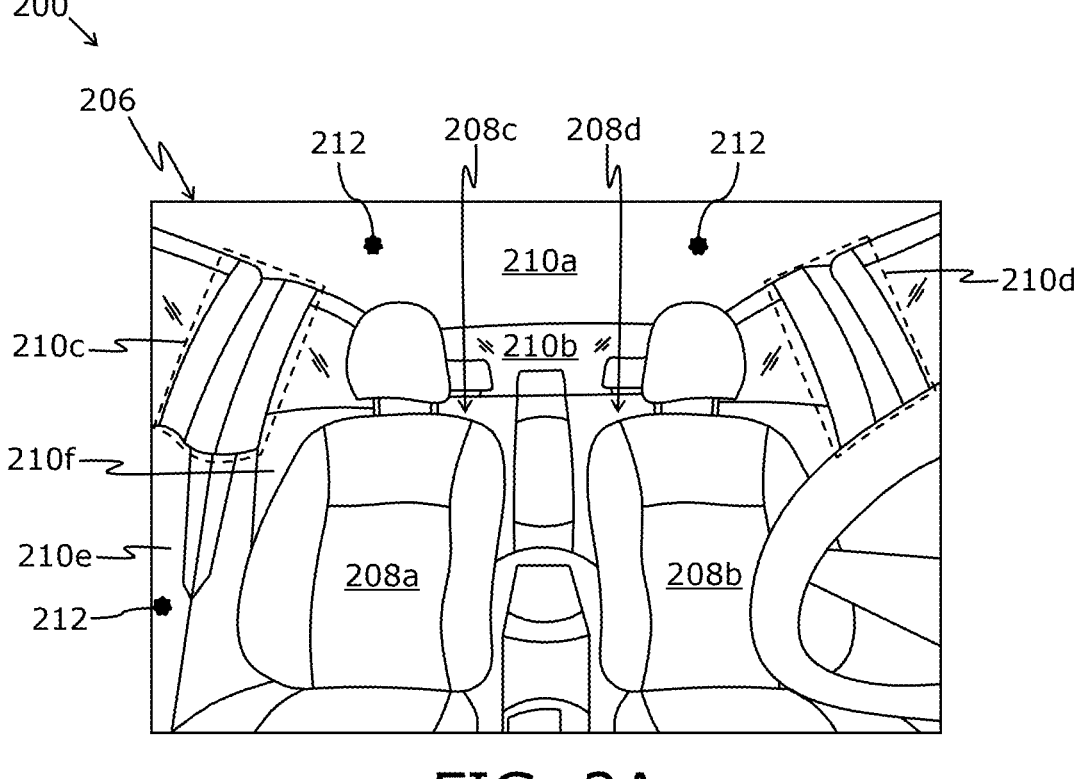
Figure 2B:
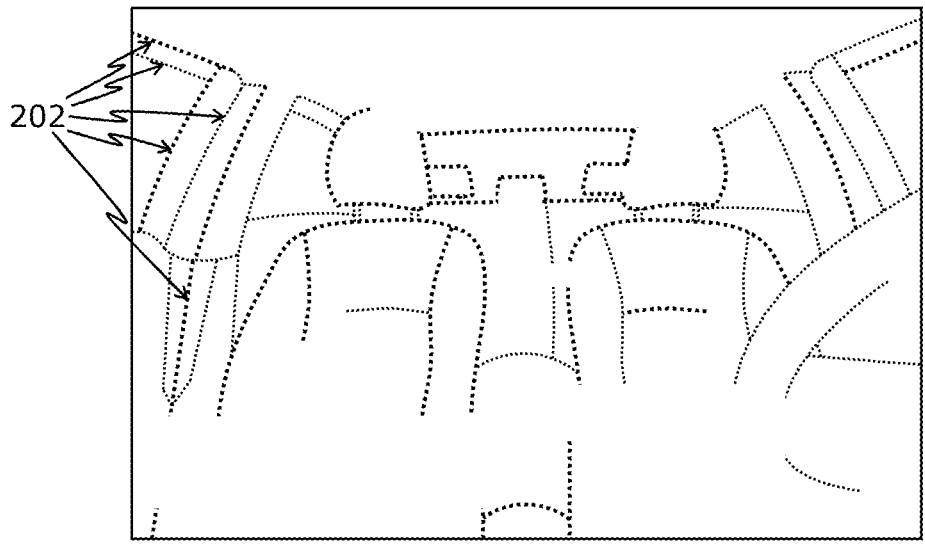
FIGS. 2B and 2C illustrate different features extracted from said reference image, in accordance with an embodiment of the present disclosure.
Figure 2C:
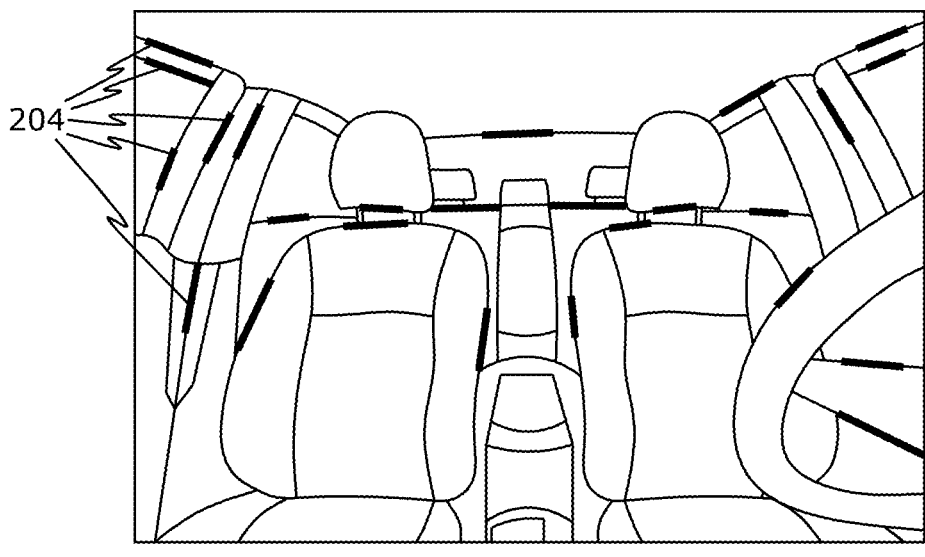

Referring to FIGS. 2A, 2B, and 2C, FIG. 2A illustrates an exemplary reference image 200, while FIGS. 2B and 2C illustrate different features 202 and 204 extracted from said reference image 200, respectively, in accordance with an embodiment of the present disclosure. With reference to FIG. 2A, the reference image 200 is captured using at least one tracking camera arranged inside an enclosed space 206 (depicted as a cabin of a vehicle (for example, such as a car)). The at least one tracking camera is understood to be arranged on a dashboard of the vehicle to face at least one user (not shown) sitting on at least one seat (for example, depicted as seats 208*a*, 208*b*, 208*c*, and 208*d*) of the vehicle, for capturing the reference image 200 from a perspective as shown in FIG. 2A. The enclosed space 206 comprises non-adjustable parts 210*a*, 210*b*, 210*c*, 210*d*, 210*e*, and

210*f*, for example, depicted as a ceiling, a rear windshield, a left B-pillar, a right B-pillar, a front left door, and a rear left door, of the vehicle, respectively, wherein IR visual markers 212 are arranged on the at least one non-adjustable part 210*a-f* of the enclosed space 206. The enclosed space 206 further comprises adjustable parts, for example, depicted as the seats 208*a*, 208*b*, 208*c*, and 208*d*.

With reference to FIGS. 2B and 2C, the features 202 (depicted using dotted lines) and 204 (depicted using thick solid lines) are extracted from the reference image 200 by employing at least one feature extraction algorithm. It will be appreciated that the features 202 and 204 pertain to both the non-adjustable parts 210*a*, 210*b*, 210*c*, 210*d*, 210*e*, and 210*f* and the adjustable parts of the enclosed space 206. With reference to FIG. 2B, the features 202 are shown as edges. With reference to FIG. 2C, the features 204 are shown as lines. For sake of simplicity and clarity, only two types of features (namely, the edges and the lines) are shown to be extracted from the reference image 200. However, there could also be other types of features, for example, such as corners and blobs, extracted from the reference image 200, in addition to the edges and the lines.

Figure 3:
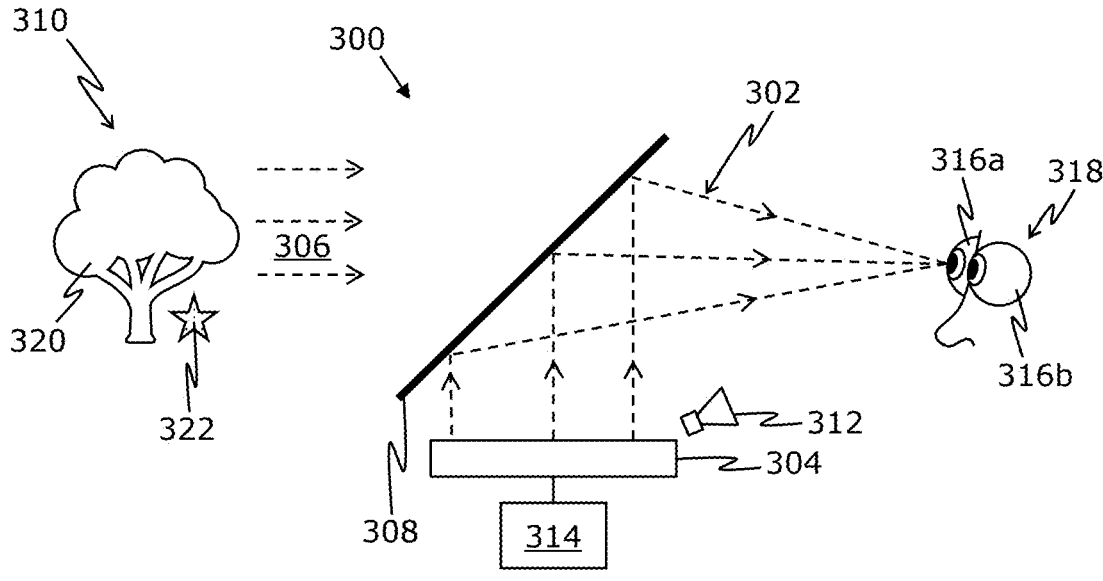
FIG. 3 illustrates an exemplary scenario in which a synthetic light field is produced using a light field display unit, and is optically combined with a real-world light field using an optical combiner, in accordance with an embodiment of the present disclosure.

Referring to FIG. 3, illustrated is an exemplary scenario 300 in which a synthetic light field 302 is produced using a light field display unit 304, and is optically combined with a real-world light field 306 using an optical combiner 308, in accordance with an embodiment of the present disclosure. With reference to FIG. 3, a real-world environment 310 is shown, where at least one tracking camera (depicted as a tracking camera 312) is utilised, after calibrating the tracking camera 312, by at least one processor (depicted as a processor 314) to determine a relative location of a first eye 316*a* and of a second eye 316*b* of at least one user (depicted as a user 318) with respect to the optical combiner 308, the optical combiner 308 being arranged on an optical path of the light field display unit 304 and on an optical path of the real-world light field 306 of the real-world environment 310. In the real-world environment 310, there are one or more real-world objects, depicted as a real-world object 320 (shown as a tree). An input to be employed by the light field display unit 304 is generated by the processor 314, based on the relative location of the first eye 316*a* and of the second eye 316*b* of the user 318 with respect to the optical combiner 308. The input is employed at the light field display unit 304 to produce the synthetic light field 302 presenting virtual content 322, for example, such as a virtual object (depicted as a star having a dotted pattern). For illustration purposes only, the virtual content 322 is shown to be presented at an optical depth that is (almost) same as an optical depth of the real-world object 320. The optical combiner 308 is employed to reflect a first part and a second part of the synthetic light field 302 towards the first eye 316*a* and the second eye 316*b*, respectively, whilst optically combining the first part and the second part of the synthetic light field 302 with the real-world light field 306.

FIGS. 2A, 2B, 2C, and 3 are merely examples, which should not unduly limit the scope of the claims herein. A person skilled in the art will recognize many variations, alternatives, and modifications of embodiments of the present disclosure.

Figure 4:
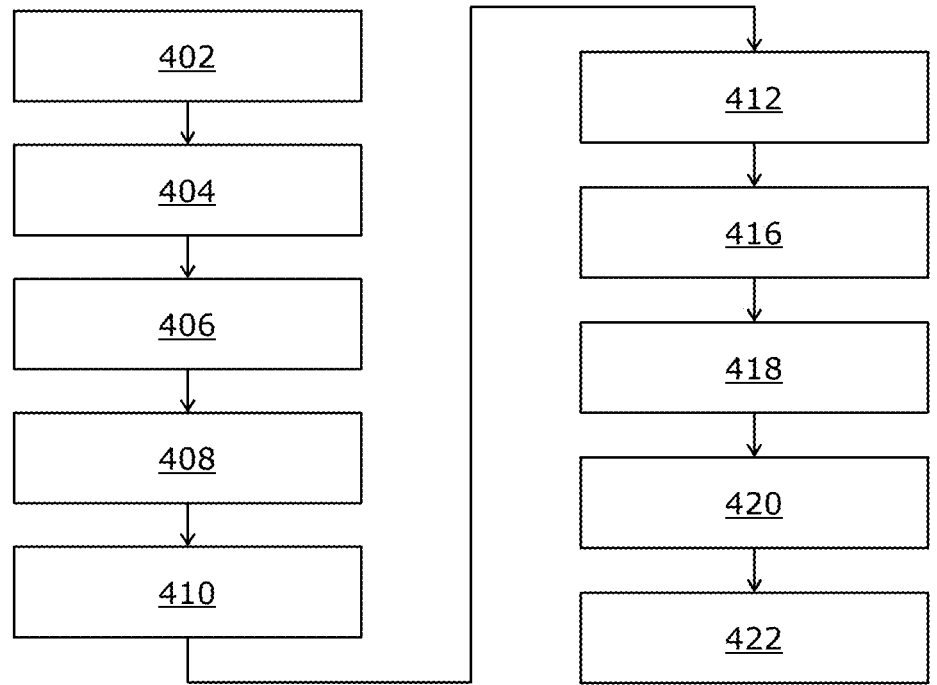
FIG. 4 illustrates steps of a method incorporating on-the-fly recalibration of a tracking camera, in accordance with an embodiment of the present disclosure.

Referring to FIG. 4, illustrated are steps of a method incorporating on-the-fly recalibration of a tracking camera, in accordance with an embodiment of the present disclosure. With reference to FIG. 4, at step 402, a first set of reference images is captured using at least one tracking camera that is arranged inside an enclosed space. At step 404, features are extracted from the first set of reference images. At step 406, a first set of features are selected from amongst the features extracted from the first set of reference images, wherein the first set of features pertain to at least at least one non-adjustable part of the enclosed space. At step 408, positions of the features of the first set are determined. At step 410, at least one latest image is captured using the at least one tracking camera. At step 412, features are extracted from the at least one latest image. At step 414, a second set of features are selected from amongst the features extracted from the at least one latest image, wherein the second set of features pertain to at least the at least one non-adjustable part of the enclosed space and match with at least a subset of the first set of features. At step 416, positions of the features of the second set are determined. At step 418, a difference is determined between a position of a given feature of the second set and a position of a corresponding feature of the first set. At step 420, the at least one tracking camera is calibrated based on the difference in the position of the given feature and the position of the corresponding feature.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

at least one tracking camera arranged inside an enclosed space; and at least one processor configured to:

capture a first set of reference images using the at least one tracking camera;

extract features from the first set of reference images;

select, from amongst the features extracted from the first set of reference images, a first set of features that pertain to at least one non-adjustable part of the enclosed space;

determine positions of the features of the first set;

capture at least one latest image using the at least one tracking camera;

extract features from the at least one latest image;

select, from amongst the features extracted from the at least one latest image, a second set of features that pertain to at least the at least one non-adjustable part of the enclosed space and that match with at least a subset of the first set of features;

determine positions of the features of the second set;

determine a difference in a position of a given feature of the second set and a position of a corresponding feature of the first set; and calibrate the at least one tracking camera based on the difference in the position of the given feature and the position of the corresponding feature;

wherein the enclosed space is a cabin of a vehicle, the system further comprising at least one sensor employed to detect a setting of at least one adjustable seat parameter of at least one seat of the vehicle, wherein the at least one processor is configured to:

detect, using the at least one sensor, settings of the at least one adjustable seat parameter of the at least one seat, when capturing a plurality of sets of reference images, the plurality of sets of reference images comprising the first set of reference images and at least one other set of reference images;

classify the plurality of sets of reference images based on different settings of the at least one adjustable seat parameter;

detect, using the at least one sensor, a latest setting of the at least one adjustable seat parameter of the at least one seat, when capturing the at least one latest image; and select the first set of reference images from amongst the plurality of sets of reference images, based on a match between the latest setting of the at least one adjustable seat parameter when the at least one latest image is captured and a setting of the at least one adjustable seat parameter when the first set of reference images was captured.

2. The system of claim 1, wherein the at least one tracking camera comprises at least one depth camera, wherein the at least one processor is configured to:

capture a first set of reference depth images using the at least one depth camera, when capturing the first set of reference images, wherein the positions of the features of the first set are determined by utilising the first set of reference depth images; and capture at least one latest depth image using the at least one depth camera, when capturing the at least one latest image, wherein the positions of the features of the second set are determined by utilising the at least one latest depth image.

3. The system of claim 1, wherein the at least one tracking camera comprises at least one infrared (IR) camera, and wherein IR visual markers are arranged on the at least one non-adjustable part of the enclosed space.

4. The system of claim 1, wherein the first set of features and the second set of features pertain to the at least one seat of the vehicle also.

5. The system of claim 1, wherein the at least one processor is configured to calibrate the at least one sensor based on the difference in the position of the given feature and the position of the corresponding feature.

6. The system of claim 1, further comprising an ambient light sensor, wherein the at least one processor is configured to:

capture, using the ambient light sensor, average illuminances inside the enclosed space, when capturing a plurality of sets of reference images, the plurality of sets of reference images comprising the first set of reference images and at least one other set of reference images;

classify the plurality of sets of reference images based on different ranges of average illuminances;

capture, using the ambient light sensor, an average illuminance inside the enclosed space, when capturing the at least one latest image; and select the first set of reference images from amongst the plurality of sets of reference images, based on a match between the average illuminance when the at least one latest image is captured and a range of average illuminances when the first set of reference images was captured.

7. The system of claim 1, further comprising at least one temperature sensor, wherein the at least one processor is configured to:

determine, using the at least one temperature sensor, ambient temperatures inside the enclosed space, when capturing a plurality of sets of reference images, the plurality of sets of reference images comprising the first set of reference images and at least one other set of reference images;

classify the plurality of sets of reference images based on different ranges of ambient temperatures;

determine, using the at least one temperature sensor, an ambient temperature inside the enclosed space, when capturing the at least one latest image; and select the first set of reference images from amongst the plurality of sets of reference images, based on a match between the ambient temperature when the at least one latest image is captured and a range of ambient temperatures when the first set of reference images was captured.

8. The system of claim 1, further comprising a plurality of temperature sensors arranged at different parts of the enclosed space, wherein the at least one processor is configured to:

determine a temperature gradient across the enclosed space using the plurality of temperature sensors, when capturing the at least one latest image; and determine a shift in the position of the given feature of the second set due to the temperature gradient, wherein the at least one tracking camera is calibrated further based on the shift in the position of the given feature due to the temperature gradient.

9. The system of claim 1, wherein the enclosed space is a cabin of a vehicle, the system further comprising at least one sensor employed to sense an orientation of the vehicle, wherein the at least one processor is configured to:

detect when the orientation of the vehicle is greater than a predefined threshold orientation; and when it is detected that the orientation of the vehicle is greater than the predefined threshold orientation, any one of:

capturing, using the ambient light sensor, an average illuminance inside the enclosed space, when capturing the at least one latest image; and selecting the first set of reference images from amongst the plurality of sets of reference images, based on a match between the average illuminance when the at least one latest image is captured and a range of average illuminances when the first set of reference images was captured.

10. The system of claim 1, further comprising a light field display unit, and an optical combiner arranged on an optical path of the light field display unit and on an optical path of a real-world light field of a real-world environment, wherein the at least one processor is configured to:

utilise the at least one tracking camera, after calibrating the at least one tracking camera, to determine a relative location of a first eye and of a second eye of at least one user with respect to the optical combiner;

generate an input to be employed by the light field display unit for producing a synthetic light field, based on the relative location of the first eye and of the second eye of the at least one user with respect to the optical combiner; and employ the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

11. A method comprising:

capturing a first set of reference images using at least one tracking camera that is arranged inside an enclosed space;

extracting features from the first set of reference images;

selecting, from amongst the features extracted from the first set of reference images, a first set of features that pertain to at least one non-adjustable part of the enclosed space;

determining positions of the features of the first set;

capturing at least one latest image using the at least one tracking camera;

extracting features from the at least one latest image;

selecting, from amongst the features extracted from the at least one latest image, a second set of features that pertain to at least the at least one non-adjustable part of the enclosed space and that match with at least a subset of the first set of features;

determining positions of the features of the second set;

determining a difference in a position of a given feature of the second set and a position of a corresponding feature of the first set; and calibrating the at least one tracking camera based on the difference in the position of the given feature and the position of the corresponding feature;

wherein the enclosed space is a cabin of a vehicle, and wherein the method further comprises:

detecting, using at least one sensor, settings of the at least one adjustable seat parameter of at least one seat of the vehicle, when capturing a plurality of sets of reference images, the plurality of sets of reference images comprising the first set of reference images and at least one other set of reference images;

classifying the plurality of sets of reference images based on different settings of the at least one adjustable seat parameter;

detecting, using the at least one sensor, a latest setting of the at least one adjustable seat parameter of the at least one seat, when capturing the at least one latest image; and selecting the first set of reference images from amongst the plurality of sets of reference images, based on a match between the latest setting of the at least one adjustable seat parameter when the at least one latest image is captured and a setting of the at least one adjustable seat parameter when the first set of reference images was captured.

12. The method of claim 11, wherein the at least one tracking camera comprises at least one depth camera, and wherein the method further comprises:

capturing a first set of reference depth images using the at least one depth camera, when capturing the first set of reference images, wherein the positions of the features of the first set are determined by utilising the first set of reference depth images; and capturing at least one latest depth image using the at least one depth camera, when capturing the at least one latest image, wherein the positions of the features of the second set are determined by utilising the at least one latest depth image.

13. The method of claim 11, wherein the at least one tracking camera comprises at least one infrared (IR) camera, and wherein IR visual markers are arranged on the at least one non-adjustable part of the enclosed space.

14. The method of claim 11, wherein the first set of features and the second set of features pertain to the at least one seat of the vehicle also.

15. The method of claim 11, further comprising calibrating the at least one sensor based on the difference in the position of the given feature and the position of the corresponding feature.

16. The method of claim 11, further comprising:

capturing, using an ambient light sensor, average illuminances inside the enclosed space, when capturing a plurality of sets of reference images, the plurality of sets of reference images comprising the first set of reference images and at least one other set of reference images;

classifying the plurality of sets of reference images based on different ranges of average illuminances;

capturing, using the ambient light sensor, an average illuminance inside the enclosed space, when capturing the at least one latest image; and selecting the first set of reference images from amongst the plurality of sets of reference images, based on a match between the average illuminance when the at least one latest image is captured and a range of average illuminances when the first set of reference images was captured.

17. The method of claim 11, further comprising:

determining, using at least one temperature sensor, ambient temperatures inside the enclosed space, when capturing a plurality of sets of reference images, the plurality of sets of reference images comprising the first set of reference images and at least one other set of reference images;

classifying the plurality of sets of reference images based on different ranges of ambient temperatures;

determining, using the at least one temperature sensor, an ambient temperature inside the enclosed space, when capturing the at least one latest image; and selecting the first set of reference images from amongst the plurality of sets of reference images, based on a match between the ambient temperature when the at least one latest image is captured and a range of ambient temperatures when the first set of reference images was captured.

18. The method of claim 11, further comprising:

determining a temperature gradient across the enclosed space using a plurality of temperature sensors, when capturing the at least one latest image, wherein the plurality of temperature sensors arranged at different parts of the enclosed space; and determining a shift in the position of the given feature of the second set due to the temperature gradient, wherein the at least one tracking camera is calibrated further based on the shift in the position of the given feature due to the temperature gradient.

19. The method of claim 11, wherein the enclosed space is a cabin of a vehicle, and wherein the method further comprises:

detecting when an orientation of the vehicle is greater than a predefined threshold orientation, wherein at least one sensor is employed to sense the orientation of the vehicle; and when it is detected that the orientation of the vehicle is greater than the predefined threshold orientation, performing any one of:

determining a shift in the position of the given feature of the second set due to the orientation of the vehicle, wherein the at least one tracking camera is calibrated further based on the shift in the position of the given feature of the second set due to the orientation of the vehicle, or skipping calibrating the at least one tracking camera.

20. The method of claim 11, further comprising:

utilising the at least one tracking camera, after calibrating the one tracking camera, to determine a relative location of a first eye and of a second eye of at least one user with respect to an optical combiner, the optical combiner being arranged on an optical path of a light field display unit and on an optical path of a real-world light field of a real-world environment;

generating an input to be employed by the light field display unit for producing a synthetic light field, based on the relative location of the first eye and of the second eye of the at least one user with respect to the optical combiner; and employing the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

* * * * *